United States Patent [19]
Fernandez

[11] Patent Number: 5,542,306
[45] Date of Patent: Aug. 6, 1996

[54] DRAG BRAKE FOR TRUCK MOUNTED, CLUTCH OPERATED POWER TAKEOFF DEVICE

[75] Inventor: Rickey J. Fernandez, Broken Arrow, Okla.

[73] Assignee: Muncie Power Products, Inc., Muncie, Ind.

[21] Appl. No.: 389,775

[22] Filed: Feb. 16, 1995

[51] Int. Cl.⁶ .......................... F16H 37/00; F16D 67/04
[52] U.S. Cl. .......................... 74/15.86; 192/7; 192/18 A; 188/83; 188/264 E
[58] Field of Search ................. 74/15.66, 15.86; 192/7, 12 R, 12 C, 15, 18 A; 188/83, 264 E; 180/53.8

[56] References Cited

U.S. PATENT DOCUMENTS

| | | |
|---|---|---|
| 3,041,884 | 7/1962 | Elfes ........................ 74/15.86 |
| 3,540,297 | 11/1970 | Wagner et al. . |
| 3,831,722 | 8/1974 | Deschamps . |
| 3,872,954 | 3/1975 | Nordstrom et al. . |
| 4,108,291 | 8/1978 | Zenker . |
| 4,275,607 | 6/1981 | Snoy . |
| 4,399,715 | 8/1983 | Dziuba et al. . |
| 4,594,906 | 6/1986 | Vincent et al. . |
| 4,640,378 | 2/1987 | Dobberpuhl et al. . |
| 4,751,989 | 6/1988 | Shinokawa et al. . |
| 4,811,614 | 3/1989 | Lasoen . |
| 4,944,193 | 7/1990 | Harada et al. . |
| 5,099,936 | 3/1992 | Irikura et al. . |
| 5,228,355 | 7/1993 | Smith et al. ................ 74/15.86 X |

*Primary Examiner*—Richard M. Lorence
*Attorney, Agent, or Firm*—Myers, Liniak & Berenato

[57] ABSTRACT

A drag brake mechanism prevents rotation of the shaft of a truck mounted connect-disconnect, clutch-operated, power takeoff device when the clutch is in its disconnect mode, by applying a constant braking force to the shaft which cannot be overcome by inadvertent frictional forces within the discs of the clutch that may occur despite the clutch being in its disconnect mode. The constant force selected, however, is insufficient to create undue heat during normal shaft rotation and is easily overcome when the clutch is placed in its connect mode.

26 Claims, 4 Drawing Sheets

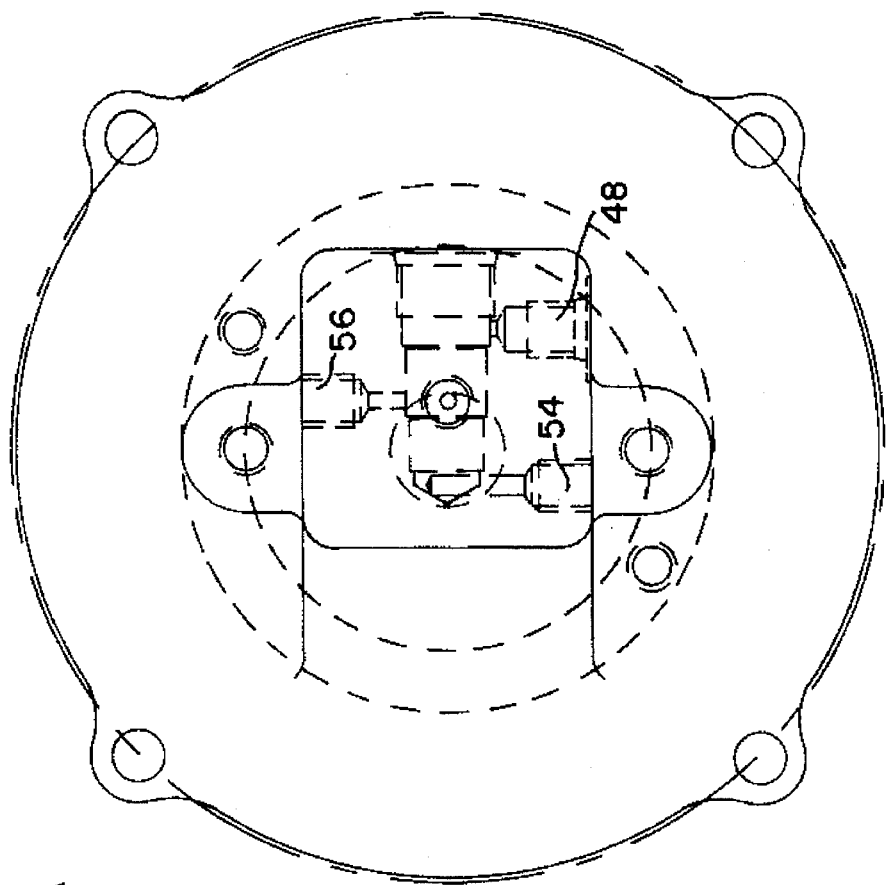
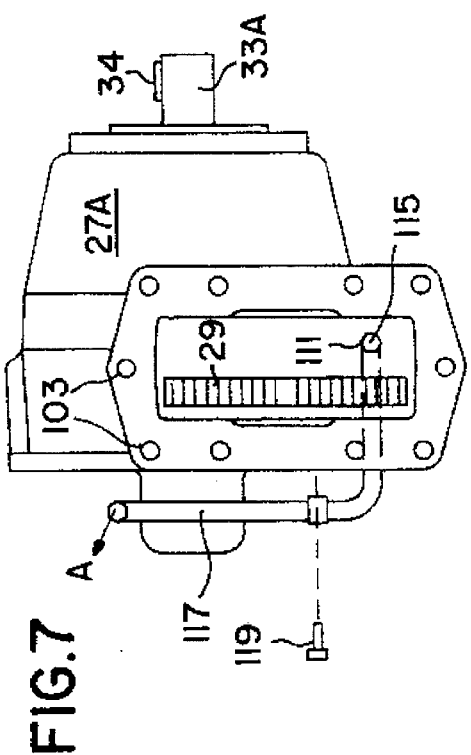
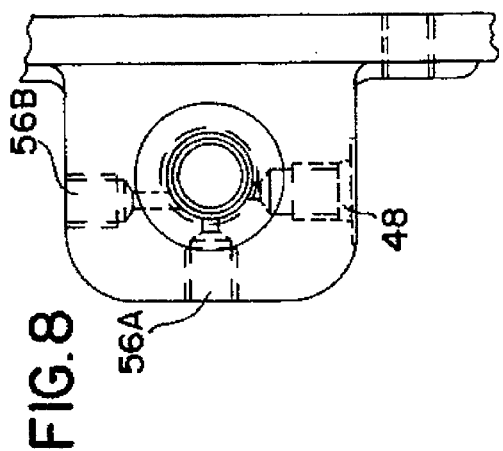

DRAG BRAKE FOR TRUCK MOUNTED, CLUTCH OPERATED POWER TAKEOFF DEVICE

This invention relates to power takeoff devices mounted on trucks for performing auxiliary work. More particularly, this invention relates to a drag brake for connect-disconnect, clutch-operated power takeoff devices which are connected to a truck transmission for operating auxiliary, hydraulically powered, equipment on the truck.

Power takeoff devices (referred to in the art as "PTO's") for use on truck transmissions are well-known and came in many different styles and designs. Of particular interest here, to this invention, is the conventional gear-type PTO which is mounted to the transmission of a truck such that when the gears of the PTO are shifted to engage those of the truck's transmission, a shaft within the PTO is caused to rotate. The rotation of the shaft is then used to perform work auxiliary to the truck. Typically, in this respect, the shaft is used to power a hydraulic pump which via its own controls, operates auxiliary equipment on the truck (e.g. dump bed, garbage compactor, etc.).

There are two basic configurations of a PTO/pump combination which are popular in commerce. The first is referred to as the "direct mount" type in which the stub shaft of the PTO is directly mounted to the pump. In the second configuration, there is attached to the PTO's stub shaft an extension shaft leading to the pump. This second configuration is therefore referred to as a "remote mount" type PTO/pump configuration. Both of these configurations form a suitable environment in which the subject invention finds utility.

Typical examples of the types of trucks having auxiliary functions operated by such PTO's (i.e. either configuration) include dump trucks, garbage compactor trucks, snow plows and various types of utility trucks which have associated with them a wide variety of auxiliary equipment such as post hole diggers, winches, man-lifts, and the like. The choice between the use of a "direct mount" or "remote mount" configuration usually is dictated by the availability of space under the truck's frame associated with the truck's transmission to which the PTO must be attached.

Because the PTO/pump arrangement, of either configuration, is located out of sight of the operator, it is conventional to employ with the operating controls for the two devices (i.e. PTO engagement/disengagement is operated by controls separate from those of the pump), a warning light for the PTO to indicate its engagement with the truck's transmission, the resultant rotation of the shaft and thus the potential for the pump to perform its intended task if its separate controls are placed in their appropriate position. These separate PTO and pump controls are normally, therefore, appropriately designed to prevent inadvertent actuation and are popularly located in the truck's cab, although at times they may be located outside the cab. All such control configurations are applicable to the subject invention as long as they are adopted to the principles of this invention hereinafter described.

One particular and somewhat popular type of PTO known in the art is the so-called connect-disconnect, clutch-operated PTO. An example of such a PTO is found in U.S. Pat. No. 3,540,297. Such PTO's are operated through an aligned multi-disc stack arrangement located between the shaft of the PTO and the gears of the PTO which engage their respective gears of the truck's transmission. When an axial force is applied to the disc stack, usually by overcoming an oppositely directed biasing force of a coil spring, the individual discs in the stack are forced together such that the interfacial friction between the discs cause the shaft to be rotationally joined to the rotating gears. Engagement and disengagement of the clutch is conventionally effected by an electrically operated solenoid valve arrangement whose switch is located (along with an appropriate warning light) in the cab of the truck.

A known problem in the aforesaid connect-disconnect clutch operated PTO's is that, for one or more reasons, when disengagement of the PTO is attempted, or believed to have been accomplished, thereby presumably relieving the inter-disc friction among the discs and stopping shaft rotation, the discs continue to exhibit sufficient frictional connection to create continued, unwanted shaft rotation. Such a condition may exist due to, for example, one or more discs being out of tolerance, contamination in the disc stack, or the like. Inadvertent shaft rotation, furthermore, may occur not only through continued rotation after activation of the PTO control from its engaged to its disengaged position, but later, at random times after initial disengagement has been successfully achieved.

In order to overcome this problem it has been known to employ brake mechanisms on or in association with such rotating shafts. Prior to this invention, however, such brake mechanisms have found it necessary to employ rather elaborate mechanisms for engaging and disengaging the brake to stop the shaft from rotating or allow its rotation respectively. Some of these brake systems, furthermore, are not truly useful in the environment of a truck or its operation. Examples of various engage/disengage braking mechanisms include U.S. Pat. Nos. 3,831,722; 4,108,291; 4,751,939; 3,872,954; 4,275,607; 4,399,715; 4,594,906; 4,640,378; 4,671,395; 4,811,614; 5,099,936; and 4,944,193.

In view of the nature of the engage-disengage mechanisms heretofore known, it is apparent that there exists a need in the art for a different type of brake mechanism which can overcome the above-described problems in the truck mounted, connect-disconnect, clutch-operated power takeoff art. It is a purpose of this invention to fulfill this and other needs in the art more apparent to the skilled artisan once given the following disclosure.

SUMMARY OF THE INVENTION

Generally speaking, this invention fulfills the above-described needs in the art by providing in a connect-disconnect, clutch-operated power takeoff device for mounting on a truck transmission, the power takeoff device having a rotatable shaft mounted therein for providing power to operate auxiliary equipment associated with the truck, the clutch being formed of a plurality of aligned friction discs and means for frictionally engaging the discs thereby to cause the shaft to rotate and for disengaging the discs; the improvement comprising: a brake means associated with the shaft, the brake means constantly applying a braking force to the shaft of a magnitude sufficient to prevent the shaft from rotating when the means for engaging and disengaging the discs is operated to disengage the discs but of an insufficient magnitude so as to be overcome when the means for engaging and disengaging the discs is operated to engage the discs thereby to allow the shaft to rotate.

In certain preferred embodiments of this invention the connect-disconnect clutch is hydraulically operated and the power takeoff device further includes means for hydraulically operating the clutch. In certain further preferred embodiments the magnitude of the constantly applied braking force is selected based upon the output torque of the shaft required to operate the type of auxiliary function to be powered by the power takeoff device, the magnitude so selected being sufficient to insure against unwanted rotation of the shaft after the means for engaging and disengaging the friction discs is activated to its disengaging position, but insufficient to create undue heat while allowing the shaft to rotate and to provide the selected output torque after the means for engaging and disengaging the friction discs is activated to its disengaging position.

This invention will now be described with respect to certain embodiments thereof as set forth in the accompanying illustrations, wherein:

IN THE DRAWINGS

FIG. 7 is a schematized view of showing the location of the spray nozzle with respect to the PTO gears if the PTO gears are on the left.

FIG. 8 is a partial top plan view of the embodiment of FIG. 2.

FIG. 9 is a rear plan view of the embodiment of FIG. 2.

DETAILED DESCRIPTION OF CERTAIN EMBODIMENTS OF THIS INVENTION

Figure 1:
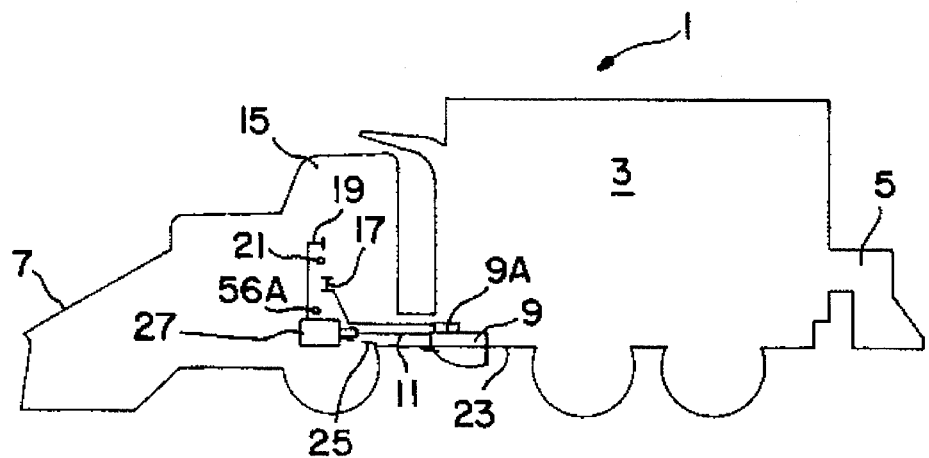
FIG. 1 is a side plan, schematized view of a truck having located thereon an embodiment of this invention.

FIG. 1 illustrates a typical heavy duty truck environment in which the subject invention finds particularly advantageous utility. As shown, truck 1 is provided with a dump bed 3, a salt spreader 5, and a snow plow 7, each of which is to be operated using known, conventional mechanisms via hydraulic pump 9. Hydraulic pump 9, in further conventional fashion, is remotely mounted on the truck chassis away from power takeoff device 27 (the subject of this invention as described more fully hereinbelow). Connecting PTO 27 to pump 9 is rotatable extension shaft 11.

While FIG. 1 illustrates a typical "remote mount" PTO/ pump configuration, it is understood that this invention is equally applicable to conventional "direct mount" PTO/ pump configurations wherein the pump is directly mounted to the output stub shaft of the PTO, rather than being connected thereto by an extension shaft 11 as shown in FIG. 1. In addition, it is understood that the drag brake/PTO combination of this invention is applicable to a wide variety of uses and truck types within the trucking industry as that term is used generically in the art.

Located in cab 15 of truck 1 are the separate controls for operating power takeoff 27 and hydraulic pump 9. In this respect, the controls are schematically illustrated to generically represent a variety of controls that may be employed. For example, controls 17 for hydraulic pump 9 may be a conventional pull cable (or plural cables) or a lever arm rod(s) which conventionally is linked to spool valve(s) 9A that control the flow, and its direction, of hydraulic fluid to the various auxiliary features 3, 5, and/or 7 on the truck. Other types of controls contemplated include electronic solenoid operated controls and air actuated controls.

In like manner, power takeoff control 19, accompanied by its requisite warning light 21, is conveniently located in cab 15. In one embodiment of this invention power takeoff control 19 is an electrical switch mechanism of known design for operating a solenoid located on power takeoff 27 which in turn through its appropriate combination of orifices in a shiftable spool valve and PTO housing provides for hydraulic actuation or deactivation of the power takeoff 27 (as hereinbelow more fully described).

Figure 2:
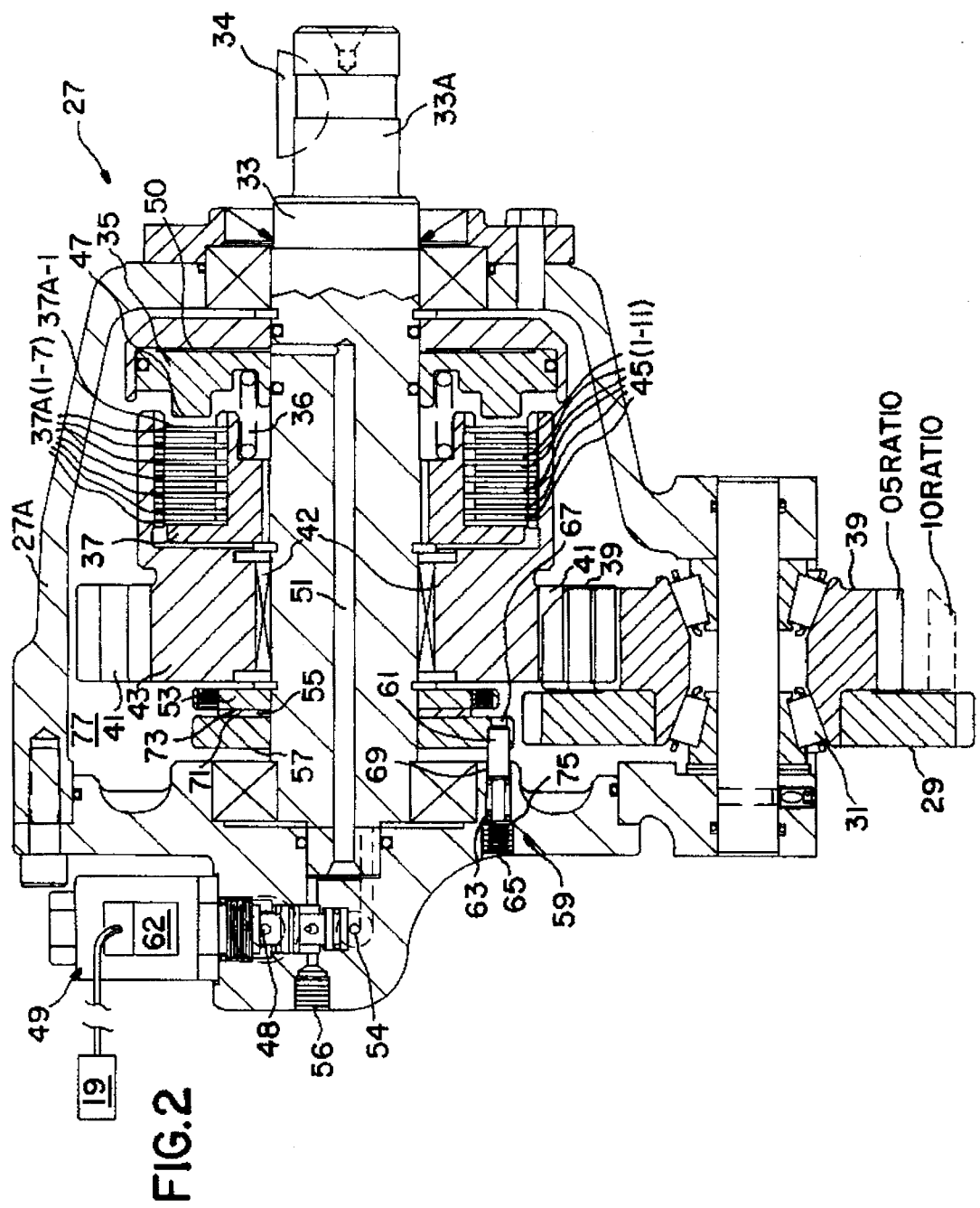
FIG. 2 is a side plan, partially sectionalized view of an embodiment of this invention as used on the truck in FIG. 1.
Figure 4:
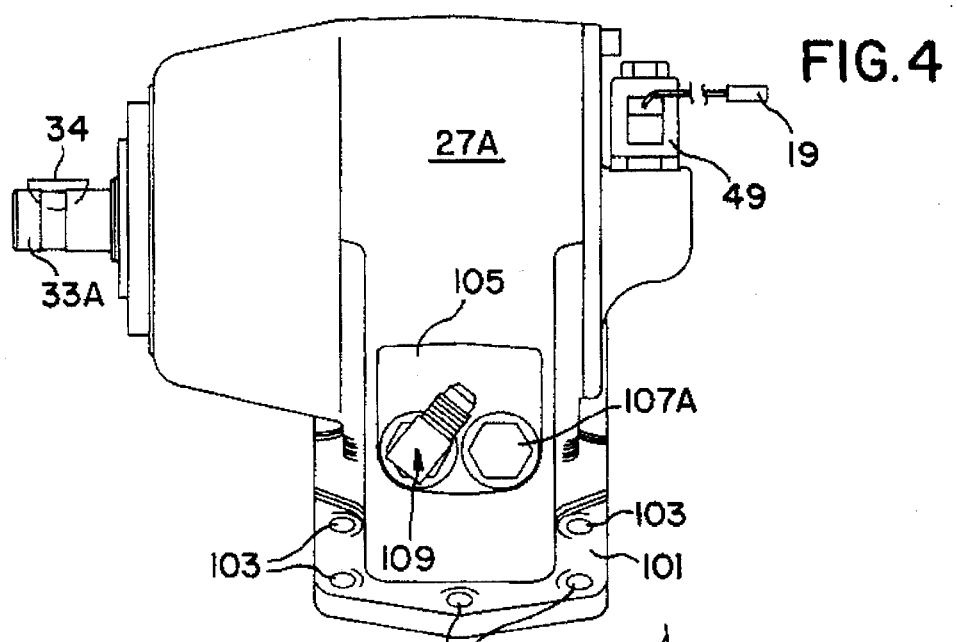
FIG. 4 is a side plan view of the embodiment of FIG. 2.

Turning now to FIG. 2 there is illustrated a power takeoff 27 of otherwise conventional design, but having within it an embodiment of the unique features of this invention. By way of orientation, such a power takeoff 27 (including housing 27A) conventionally includes a customer/input gear means 29 which is coupled to input ratio gear means 39 usually provided with a specified gear ratio applicable to the particular truck's transmission and selected torque output desired, along with cone bearing means 31. In this drawing, for example, a gear ratio of 5 is shown in solid line, and an alternative gear which may be used having a ratio of 10 is shown in dotted line. In between, ratios of 6, 7, and 8 may be provided. Also conventionally provided is output power takeoff shaft 33 having stub end 33A, which connects power takeoff 27 via key 34 (e.g. a woodruff key) to extension shaft 11 (not shown in FIG. 2) which leads to pump 9. Alternatively, stub end 33A of shaft 33 may be directly connected to pump 9 thereby to provide in a known manner, a "direct mount" PTO/pump configuration. In either this "direct mount" configuration, or in the illustrated "remote mount" configuration, unwanted rotation of shaft 33 is prevented as described below by the practice of this invention.

Associated with the operation of gear means 29 and shaft 33 is a connect, disconnect clutch mechanism of known design. Such a mechanism includes, for example, piston 35 and clutch hub 37. To clutch hub 37 there is attached a plurality of friction discs 37A (here Nos. 1–7). Piston 35 and hub 37 are attached to shaft 33 so as to rotate whenever shaft 33 rotates. Hub 37 is non-movably attached to shaft 33, while piston 37 is slidably attached thereto. Spring 36 is located between hub 37 and piston 35 and biases piston 35 away from rearwardmost friction disc 37A-1 in the friction disc stack 37A (1–7).

Constantly rotating with the rotating gears of the truck's transmission and thus not attached to shaft 33, are customer/ input gear means 29, input ratio gear means 39 and output gear means 41 (including hub 43) is allowed to rotate about shaft 33 on needle roller bearing 42 whenever the PTO is engaged with the rotating gears of the truck's transmission and the clutch mechanism has successfully achieved its disengage position so that shaft 33 is not rotating. Output gear means 41 has attached thereto (within hub 43) a plurality of spacer discs 45 (here Nos. 1–11) located so as to be interspersed between friction discs 37A (1–7). Spacer discs 45, of course, rotate whenever gear means 29, 39 rotates. If everything in the clutch mechanism operates properly, friction discs 37A do not rotate when the clutch mechanism is in its disengage position and thus rotating spacer discs 45 merely rotatably slide between their respective friction discs 37A. It is when something improperly occurs in the disengage position that the problem of unwanted (inadvertent) shaft rotation arises. Such improprieties include contamination, improper sizing or any other condition that prevents discs 45 from freely sliding between discs 37A.

In this respect, in normal operation, output shaft 33 of power takeoff 27 is either rotated or not rotated by activation of the clutch mechanism. Activation or deactivation is caused by headend 47 of piston 35 sliding on shaft 33 to either compressingly engage the disc stack against the separating biasing force of spring 36 (i.e. activation) or, by sliding in the opposite direction under the biasing force of spring 36 to disengagement the disc stack (i.e. deactivation, the position as illustrated in FIG. 2). By compressing the disc stack, the inter-disc friction created between normally non-rotating friction discs 37A (1–7) and rotating (whenever the truck's transmission gears are rotating) spacer discs 45 causes friction discs 37A to be driven by rotating spacer discs 45 thereby to rotate shaft 33 to which friction discs 37A are attached. By reversing the process and allowing spring 36 to retract piston 35 from disengagement, and if no intervening impropriety occurs, the disc stack is deprived of the necessary amount of interdisc friction and shaft 33 ceases to rotate.

Unfortunately, in practice, as alluded to above, improprieties such as, for example, contamination, imperfectly manufactured discs, sticking discs, and/or the like, cause the disc stack not to fully release and inadvertent rotation of shaft 33 may continue after retraction of piston 35. In addition, spontaneous, unwanted shaft rotation may occur after retraction of piston 35 even though the disc stack was successfully separated enough at the time of retraction to prevent rotation of the shaft for some arbitrary, finite period of time. Such rotation, in either instance, is undesirable, particularly in view of the fact that the conventional PTO indicator light used throughout the art will not be lit under these conditions. Thus, the need for the subject invention arises, so as to prevent such unwanted rotation, in a feasible and economically desirable manner.

Figure 3:
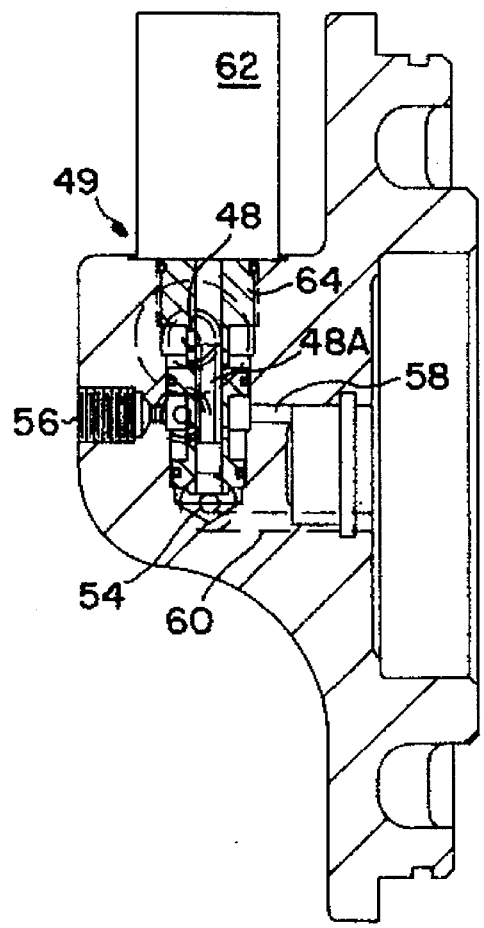
FIG. 3 is a side sectional view of an embodiment of a solenoid valve in its pressure mode.
Figure 3A:
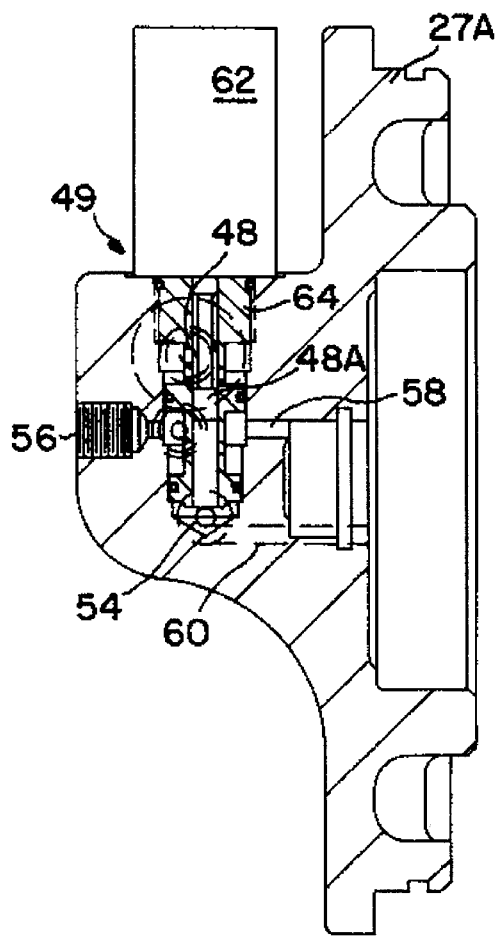
FIG. 3A is a side sectional view of the solenoid valve of FIG. 3 in its exhaust mode.

The most convenient way, and perhaps, therefore, the most conventional way of actuating piston 35 is through an electrically operated solenoid, hydraulically actuated mechanism as illustrated in FIG. 2, 3, and 3A. Other techniques are, of course, contemplated herein, such as air actuation. As illustrated, solenoid valve 49 (described more fully herein below) may be electrically actuated via a simple tilt switch 19 in cab 15 of truck 1. This causes pressurized transmission fluid from the transmission of the truck to flow [via pressure port 48 and valve spool 48A (FIGS. 3, 3A)] of the solenoid valve through central orifice 51 in shaft 33 to a location 50 behind piston 35. This, in turn, forces piston 35 against the bias of spring 36, compressing and overcoming it, thus sliding piston head 47 from its illustrated position into contact with the rear surface of disc 37A-1. Further compression, of course, creates the necessary degree of inter-disc friction to cause shaft 33 to rotate.

The selection of the degree of friction created within the disc stack of the clutch is conventional and is generally selected based upon the required output torque for shaft 33. In general, the torque must be large enough such that sufficient hydraulic pressure is created by pump 9 to perform the intended auxiliary work on the truck (e.g. raise dump bed 3, operate salt spreader 5 and/or raise, lower snow plow 7). The biasing force, and thus size, of spring 36 is selected, again in a known way, to ensure retraction of piston 35 after switch 19 activates solenoid valve 49 to allow return flow of the transmission fluid from behind piston 35 back through central orifice 51 and out through exhaust port 54. Exhaust port 54 leads to chamber 77 within PTO housing 27A, which, of course, is in communication with the truck's transmission to which the PTO is connected. By this relief of pressure on piston 35, an appropriately chosen size for spring 36 ensures retraction of piston 35 from engagement with the disc stack. The selection of the appropriate spring size and its resultant compression force are conventional and well within the knowledge and expertise of the skilled artisan.

As stated above, this invention provides a drag brake mechanism for preventing unwanted rotation of shaft 33, simply and effectively, without creating undue heat in the system. As illustrated in FIG. 2 an embodiment of this invention is presented which comprises a brake device associated with shaft 33 that constantly produces a sufficient drag upon shaft 33 so as to overcome any realistically anticipated tendency of the shaft to rotate due to inadvertent, and unwanted inter-disc friction when piston 35 is retracted to its disengaged position (e.g. as illustrated in FIG. 2).

While the constant drag force employed (i.e. designed into the system) to prevent inadvertent, unwanted rotation of shaft 33 may vary widely depending upon the power takeoff design, its size, torque requirements, etc., generally speaking the drag force selected is based upon (i.e. is generally related to) the output torque of shaft 33 required to operate the type of auxiliary function anticipated to be performed. Thus, in general, the drag force selected should be of sufficient magnitude to ensure against unwanted rotation of shaft 33 when piston 35 is in its retracted position, but at the same time should be of insufficient magnitude so as not to create undue heating during shaft rotation, as well as, to allow for (i.e. not prevent by overdrag) the appropriate output torque of shaft 33 when it is called upon to provide the required amount of power to operate pump 9 or perform any other intended work to which shaft 33 may be connected.

In this respect, for most anticipated auxiliary operations, such as those illustrated in FIG. 2, or in other contemplated instances such as garbage compactors, utility trucks and the like, the constant drag force applied to shaft 33 should be greater than about 10 in. lbs., preferably, at least about 17 in. lbs., and more preferably about 20 in. lbs. In this latter instance, it has been found that a drag force of about 20 in. lbs. ensures against any realistic possibility of inadvertent shaft rotation except possibly in the most egregious of disc seizures or freeze up. At the same time such a drag force allows for proper operation of the PTO when it is called upon to do work in almost all normally anticipated situations.

In order to effect the necessary brake drag force as above-described and as illustrated in FIG. 2, there is provided a brake plate 53, a washer plate 55 and a pressure plate 57. Optionally, washer plate 55 can be eliminated such that brake plate 53 is contiguous pressure plate 57. Brake plate 53 is securely attached, as by press fit or the like, to shaft 33. Washer plate 55, preferably made of bronze, may be either press fit onto shaft 33, secured to a face or brake plate 53, or simply loosely fit over shaft 33. If desired, bronze washer plate 55 may be oil impregnated. In the first two alternatives, washer plate will rotate with shaft 33, while in the last instance it will not. Pressure plate 57 is specifically designed so as to have an internal diameter slightly larger than shaft 33 thereby to allow shaft 33 to freely rotate therewithin, without causing a rotational force to be applied to plate 57 at any time.

Pressure plate 57 is connected to housing 27A by one or more spring biased pin means 59, each comprised of a pin 61, biasing coil spring 63 and set screw 65. In one embodiment, for example, there may be employed two spring biased pin means 59, each 180° apart. Thus, FIG. 2 is actually generic to both a one pin and two pin means set up. For convenience, then, only one pin means 59 is actually shown in the drawings.

Each pin 61, as illustrated, has one of its ends located in orifice 67 of plate 57 and the other of its ends located in orifice 69 of housing 27A. In this way, pressure plate 57 is rendered non-rotatable and is connected to housing 27A. As further illustrated, orifice 67 of pressure plate 57 is countersunk such that the interface of the smaller and larger diameters in the countersink acts as a stop limit to a respective end of pin 61 when inserted therein.

At the other end of each pin 61, and within orifice 69 there is located, in turn, biasing coil spring 63, followed by set screw 65. The biasing force thus created by spring 63 through pin 61 against pressure plate 57 creates a frictional drag force at the interfacial surface 71 between pressure plate 57 and washer 55, as well as between interfacial surface 73 between washer 55 and brake plate 53 (if washer 55 has been mounted in a configuration where it is not integrally bonded or otherwise connected to brake plate 53).

The desired amount of drag force created on brake plate 53 (e.g. above about 10 in. lbs. as aforesaid) is governed by the pressure (force) created by the bias of coil spring 63 and the amount of friction created at the interface(s) 71 and 73 (if 73 is a frictional interface). It is possible to alter the drag force somewhat by choosing different materials for pressure plate 57, washer 55 and, where applicable, brake plate 53. In practical reality, however, this is difficult to do, since ultimately, wear from rotation renders the interface(s) smooth after a relatively short period of use. Thus the principal focus for creating the desired drag force is on the size of coil spring 63, and in one embodiment (described below), if used, upon the adjustment of set screw 65 as well.

In the embodiment illustrated in FIG. 2, set screw 65 is merely provided as a non-adjustable backstop for coil spring 63. In this instance, set screw 65 is presented by way of a countersunk screw threaded area, ending at interface 75 in orifice 69. In this configuration there is no ability to adjust the drag brake force once coil spring 63 is selected and inserted. Here, set screw 65 is simply screwed into orifice 69 until it bottoms out at interface 75 during manufacture of the PTO and is thereafter sealed to prevent oil leakage and tampering. In this embodiment, the drag force created is dictated by the design of coil spring 63 and its unadjustable degree of compression in orifice 69. In such an arrangement, potential installer or operator error, or tampering (if set screw 65 is then sealed) is avoided.

On the other hand, it may be desirable in certain instances to allow adjustment of the drag force by an installer or operator. Such a situation might arise for example, where a used power takeoff is removed from one type of vehicle and installed on another type which requires the selection of a different drag force. In another example, the replacement of a hydraulic pump may require a different drag force. In a still further example, normal wear in the coil spring or wear in a plate or washer of the drag brake mechanism may require a minor adjustment. In such instances the countersink in orifice 69 is either eliminated or redesigned such that set screw 65 becomes an adjustment mechanism for a new or the same coil spring 63, by the depth to which it is screwed into orifice 69 and thus the degree to which it compresses coil spring 63.

One of the benefits of the subject invention is that, regardless of the configuration chosen, the drag force created can be selected so as to prevent inadvertent or unwanted rotation of shaft 33, but which is easily overcome when the aforedescribed clutch mechanism is activated so as to commence desired rotation of shaft 33, without creating undue heat during desired rotation despite the fact that the drag force is continuously applied during this desired rotation. In this respect, it can be seen that through the use of appropriate materials such as bronze for washer 55 and steel for plates 53 and 57, and by employing a relatively small surface interface 72 (and 73 where applicable), as illustrated by the relative sizes in FIG. 2, the generation of heat may be kept to an acceptable minimum simply by using a cooling/lubrication technique already presented in a conventional PTO. A typical example of such a conventional cooling/lubrication system is described below. When employed, it has been found that even if the power takeoff is rotated for lengthy periods of time, in the practice of this invention, such as where the truck operator inadvertently leaves the power takeoff engaged as he is driving to a job site, no undue heat arises despite the ever present drag force of the drag brake on the PTO's shaft.

Particular note in this respect is made of the rather simple design of the drag brake mechanism as shown in FIG. 2 as well as its location which is completely internal of housing 27A, thus making it readily accessible to a simple, conventional cooling mechanism. Housing 27A by its nature, in this respect, defines an internal cavity 77 therewithin. In practice, cavity 77 is conventionally provided with a lubricating fluid (i.e. the truck's transmission fluid, not shown for convenience) which by its nature will help to dissipate heat and cool the drag brake mechanism. Whether through simple splashing of the lubrication transmission fluid circulating in housing cavity 77 or with a conventional added cooling spray as described more fully below with respect to FIGS. 4–7, any undue heat that might be generated due to the constant application of frictional force by the drag brake of this invention is easily handled, without additional cooling means being required.

Before describing in detail an embodiment of a conventional spray nozzle, PTO cooling mechanism useful in the practice of this invention, a more detailed description of solenoid valve means 49 is appropriate. While any conventional valve may be employed, and is well within the skill of the artisan to select, one type of solenoid valve found useful in the practice of this invention is a P/N SV08-30-0-V-12-DW solenoid valve sold by Hydraforce, Inc. of Wheeling, Ill. This valve is illustrated in FIG. 2, but is also further illustrated in FIGS. 3, 3A. As illustrated in these latter figures, through a series of lands and grooves in the spool 48A of solenoid valve 49 spool orifice, pressure port 48 and exhaust port 54 are alternately aligned with the transmission fluid to achieve the desired compressing activation or decompressing retraction of piston 35. In this respect, sensor port 56 is provided for sensing pressure in shaft 33's central orifice 51 via high pressure orifice 58 (which leads to orifice 51). The purpose of port 56 is to indicate whether the clutch piston 35 is under pressure or not. Port 56 leads to warning light 56A located in the cab of truck 1 which turns "on" if there is pressure in port 56.

This indicator light 56A coupled with PTO indicator switch light 21 informs the truck operator of useful information. In this respect, the system operates substantially as follows: when the PTO switch is pushed "on" light 21 goes on if current has passed to the solenoid's coil (not shown) in head 62. This then causes spool 48A to move to the position shown in FIG. 3. Pressurized fluid is then caused to flow via port 48 through the fluid path in housing solenoid valve insert 64 through line 58 and orifice 51 to chamber 50.

Exhaust port 54 and its return line 60 to chamber 77 are shut off as shown. Piston 35 is thus forced to its clutch engaging (i.e. disc stack compressing) position by the pressure of the fluid in chamber 50. As long as pressure sufficient to maintain piston 35 in its engaged position is present, light 56A will be "on" because sensor port 56 is sensing the pressure. In this respect, two alternative sensor port's 56 (FIG. 8, ports 56a, 56b) 90° apart may be provided for convenient location of the sensor Thus, when both lights are "on" the operator knows that his PTO system is engaged and shaft 33 is rotating if the truck engine is on and its transmission gears are turning.

When the PTO switch is turned to "off" the solenoid's coil is deactivated causing spool 48A to assume the position in FIG. 3A. When this occurs, the orifices in insert 64 leading to pressure orifice 58 are blocked and the flow path exhausts the fluid behind piston 35 (now sliding out of disc stack engagement due to biasing spring 36) through orifice 51, orifice 58, port 54 and orifice 60 leading to chamber 77. At the point where pressure at sensor port 56 (or 56a or b) drops below engagement pressure, light 56A is turned off, indicating to the operator disengagement of piston 35 from the disc stack, and thus no rotation of shaft 33 due to the drag force asserted on it by the brake mechanism of this invention. FIG. 9, in this respect, helps illustrate the location of the various ports.

From the above, it can be seen that through the use of the above mechanism the operation, or failure of the system is readily apparent to the truck operator. If either light is "off" when engagement is intended, the truck operator is alerted to some problem. If the PTO switch light 21 is "off" but the pressure light 56A remains "on" he is again alerted to a problem and the potential for an unwanted, rotating shaft. When both lights are "off" or "on" when intended, the system's functionality is manifested, barring some bizarre occurrence that proper maintenance should readily detect. In any event, through simple maintenance, the drag force constantly applied to shaft 33, according to this invention, ensures against unintended shaft rotation so long as the instrument panel's switches and warning lights are duly observed.

Referring now to FIGS. 4 to 7, the aforesaid conventional spray nozzle cooling mechanism for cooling the PTO, including the unique brake assembly of this invention without the need for further cooling means specially designed to handle the heat created by the drag force, is illustrated in combination with a more complete outside view of the PTO's housing. As shown best in FIG. 4, PTO housing 27A includes bottom plate 101 for bolting the PTO to the truck's transmission via bolts (not shown) which extend through bolt holes 103. In the side of housing 27A there is provided a window plate 105 having in it two screwthread plug orifices (107, left one shown in FIG. 5). One of the plug orifices 107 (here the left one) has provided in it cooling spray nozzle means 109. The other plug orifice 107 (here the right one) is plugged with screw plug 107A and is provided so that, if desired, a sensor means may be inserted for determining the speed of input gear 29.

Figure 5:
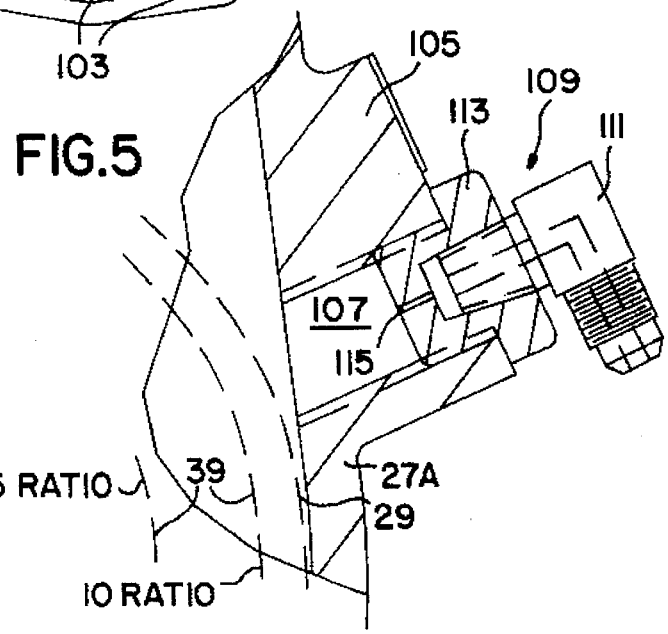
FIG. 5 is a partial, sectionalized view of the cooling spray nozzle of FIG. 4.

The nature of cooling spray nozzle means 109 is best illustrated in FIG. 5. Therein, spray nozzle 111 is attached to plate 105 (which may simply be an integral part of housing 27A if desired) by adapter screw plug 113 having a narrow spray orifice 115 therein to direct a narrow stream of transmission fluid under pressure, aimed at the appropriate part of the PTO to optimize cooling. In one embodiment, and comparing FIG. 2 to the location of nozzle 109 in FIGS. 4–7, the cooling stream of transmission fluid is directed so as to be impelled upon the gear teeth of input ratio gear 39. This in turn causes a substantial spraying and splashing of the fluid throughout chamber 77 including into cooling engagement with all relevant parts of the drag brake mechanism. Alternatively, of course, nozzle 109 may be aimed at the gear teeth of customer/input gear means 29, or directly at the drag brake mechanism.

Figure 6:
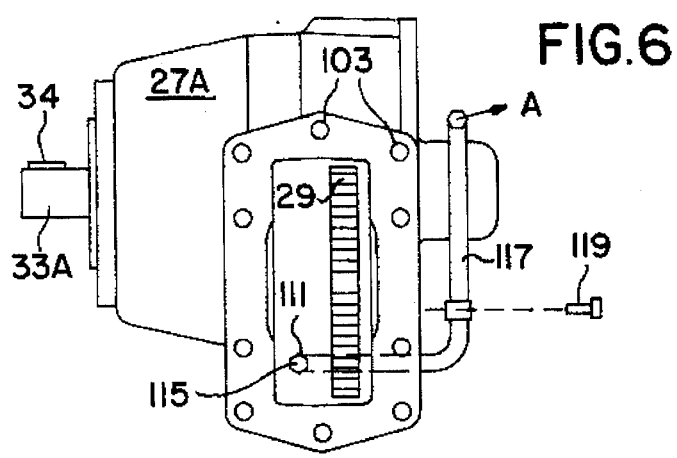
FIG. 6 is a schematized view showing the location of the spray nozzle with respect to the PTO gears, if the PTO gears are on the right.

FIGS. 6–7 are schematic illustrations of a right hand and left hand assembly of a PTO according to this invention. Which assembly to use is conventionally chosen according to the configuration of the truck's transmission and underbody to which the PTO/pump arrangement must be connected. As therein illustrated, nozzle 111 is connected to the pressurized fluid of the truck's transmission via line 117 (as shown by arrow A). Line 117 is conveniently held to housing 27A by screw 119. In these embodiments, orifice 115 is aimed at the gear teeth of ratio gears 39 (not shown for convenience). Alternatively, as stated above it could be aimed at the gear teeth of customer/input gear 29.

Once given the above disclosure many other features, modifications and improvements will become apparent to the skilled artisan. Such features, modifications and improvements are therefore considered to be a part of this invention, the scope of which is to be determined by the following claims.

I claim:

1. In a power takeoff device which includes a connect-disconnect clutch for engaging the power takeoff with or disengaging the power takeoff from a truck transmission, said power takeoff device having a rotatable shaft mounted therein for providing power to operate auxiliary equipment associated with the truck, said clutch being formed of a plurality of aligned friction discs and means for frictionally engaging said discs thereby to cause said shaft to rotate and for disengaging said discs; the improvement comprising: a drag brake associated with said shaft, said drag brake continuously applying a constant braking force to said shaft of a magnitude sufficient to prevent said shaft from rotating when said means for engaging and disengaging said discs is operated to disengage the discs but of an insufficient magnitude so as to be overcome when said means for engaging and disengaging said discs is operated to engage the discs thereby to allow said shaft to rotate.

2. A power takeoff device according to claim 1, wherein said connect-disconnect clutch is hydraulically operated and said device further includes means for hydraulically operating said clutch and wherein the magnitude of said constantly applied braking force is greater than about 10 in. lbs.

3. A power takeoff device according to claims 1 or 2, wherein the magnitude of said constantly applied braking force is at least about 17 in. lbs.

4. A power takeoff device according to claims 1 or 2, wherein the magnitude of said constantly applied braking force is about 20 in. lbs.

5. A power takeoff device according to claims 1 or 2, wherein the magnitude of said constantly applied braking force is insufficient to create undue heat when said shaft is rotating.

6. A power takeoff device according to claims 1 or 2, wherein the magnitude of said constantly applied braking force is selected based upon the output torque of said shaft required to operate a selected auxiliary function to be powered by said power takeoff device, said magnitude so selected being sufficient to ensure against unwanted rotation of said shaft after said means for engaging and disengaging said friction discs is activated to its disengaging position but insufficient to create undue heat while allowing said shaft to rotate and to provide the said required output torque after said means for engaging and disengaging said friction discs is activated to its engaging position.

7. In combination with a power takeoff device, a drag brake mechanism for preventing unwanted rotation of a rotatable output shaft in said power takeoff device designed to be connected to the transmission of a vehicle for performing auxiliary work associated with said vehicle, said drag brake mechanism comprising a brake plate means adapted to be attached to said output shaft, a pressure plate and a means for biasing said pressure plate into engagement with said brake plate thereby to create a continuous and constant anti-rotational drag force on said rotatable output shaft.

8. A combination according to claim 7, wherein said pressure plate is non-rotatable and said brake plate means includes a brake plate attachable to and rotatable with said output shaft and a washer plate so located as to be between said pressure plate and said brake plate, said drag force being created at least in part by interfacial friction between said washer plate and said pressure plate.

9. A combination according to claim 8, wherein said power takeoff includes a housing, and said drag brake mechanism further includes means for cooling said drag brake, said drag brake mechanism being locatable within said housing.

10. A combination according to claim 9, wherein said means for cooling said drag brake includes means adaptable for drawing transmission fluid under pressure from said vehicle's transmission to which said power takeoff is to be attached and for injecting said fluid into said housing at a location so as to be in cooling relationship with said drag brake mechanism.

11. A combination according to claim 9 or 10, wherein said means for biasing said pressure plate into engagement with said brake plate includes a pin means extendable between said housing and said pressure plate, and spring means biasing said pin means into pressure-creating engagement with said pressure plate thereby to create said interfacial friction between said washer plate and said pressure plate.

12. A combination according to claim 11, wherein said means for biasing said pressure plate further includes a screw means so locatable that said spring means is then located between said screw means and said pin means.

13. A combination according to claim 12, wherein said screw means comprises an adjustable screw capable of varying the amount which said spring means biases said pin into pressure-creating engagement with said pressure plate thereby creating the ability to vary the amount of said drag force placed upon said output shaft.

14. A combination according to claims 7, 8 or 9, wherein said anti-rotational drag force created by said drag brake mechanism on said output shaft is greater than about 10 in. lbs.

15. A combination according to claim 14, wherein said anti-rotational drag force is at least about 17 in. lbs.

16. A combination according to claim 14, wherein said anti-rotational drag force is about 20 in. lbs.

17. In a truck having a transmission and a power takeoff device mounted to said transmission, the connect-disconnect, clutch operated power takeoff device according to claim 1.

18. In a truck having a transmission comprised of a gear means and a power takeoff device which includes a connect-disconnect clutch for engaging the power takeoff with or disengaging the power takeoff from the transmission, said power takeoff device further including gear means connected to said gear means of said transmission so as to be rotated by said transmission's gear means whenever said transmission's gear means are rotating, said power takeoff device further including a rotatable output shaft connectable for rotation to said gear means of said power takeoff by said connect-disconnect clutch located within a housing of said power takeoff device, said truck further including control means for shifting said clutch between its connect and disconnect mode, the improvement comprising a drag brake mechanism associated with said output shaft for preventing rotation of said output shaft when said clutch is in its disconnect mode, said drag brake mechanism comprising a brake plate means attached to said output shaft, a pressure plate and a means for biasing said pressure plate into engagement with said brake plate thereby to create a constant anti-rotational drag force on said rotatable output shaft sufficient to prevent rotation of said output shaft when said clutch is in its disconnect mode, but insufficient so as to allow rotation of said output shaft at its desired level of torque when said clutch is in its connect mode.

19. In a truck according to claim 18, wherein said output shaft of said power takeoff device is connected to a hydraulic pump for pumping hydraulic fluid to auxiliary equipment attached to said truck, said pressure plate of said drag brake mechanism is non-rotatable and said brake plate means includes a brake plate attached to and rotated with said output shaft and a washer plate so located as to be between said pressure plate and said brake plate, said drag force being created at least in part by interfacial friction between said washer plate and said pressure plate.

20. In a truck according to claim 18 or 19, wherein said anti-rotational drag force is constantly applied to said output shaft and said force is greater than about 10 in. lbs.

21. In a truck according to claim 20, wherein said anti-rotational drag force is at least about 17 in. lbs.

22. In a truck according to claim 20, wherein said anti-rotational drag force is about 20 in. lbs.

23. In a truck according to claim 18, wherein said improvement further includes means for cooling said drag brake mechanism.

24. In a truck according to claim 23, wherein said means for cooling said drag brake mechanism includes means for drawing transmission fluid under pressure from said vehicle's transmission to which said power takeoff is attached and injecting said fluid into said housing of said power takeoff at a location so as to be in cooling relationship with said drag brake mechanism.

25. In a truck according to claim 18, wherein said means for biasing said pressure plate into engagement with said brake plate includes a pin means extending between said housing and said pressure plate, and spring means biasing said pin means into pressure-creating engagement with said pressure plate thereby to create said anti-rotational drag force on said output shaft.

26. In a truck according to claim 25, wherein said means for biasing said pressure plate further includes a screw means so located that said spring means is located between said screw means and said pin means.

* * * * *